March 13, 1928.  B. B. LEUSTIG ET AL  1,662,316

HANDLE

Filed March 15, 1926   2 Sheets-Sheet 1

Inventor
Benno B. Leustig
Joseph D. Petsche
By Bates, Macklin, Dolnick & Peare
Attorneys March 13, 1928.　　　　B. B. LEUSTIG ET AL　　　1,662,316
HANDLE
Filed March 15, 1926　　　2 Sheets-Sheet 2

Inventor
Benno B Leustig
Joseph D Petsche
By Bates Macklin Gabrick & Teare
Attorneys Patented Mar. 13, 1928.

1,662,316

UNITED STATES PATENT OFFICE.

BENNO B. LEUSTIG AND JOSEPH D. PETSCHE, OF CLEVELAND, OHIO.

HANDLE.

Application filed March 15, 1926. Serial No. 94,774.

This invention is concerned with handles and has for its general object the provision of a handle construction adaptable to a variety of uses. More specifically our invention is concerned with a replaceable and interchangeable handle of a sturdy, durable and economical construction which may be readily attached to and detached from the article to which it is applied.

Other objects of our invention will hereinafter become apparent in the following description which refers to the accompanying drawings illustrating two forms thereof. The essential characteristics will be summarized in the claims.

Figure 1:
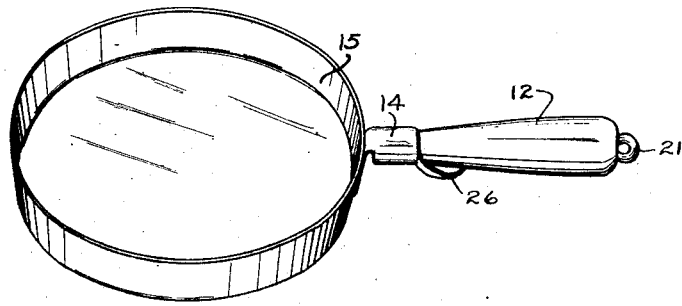
Figure 2:
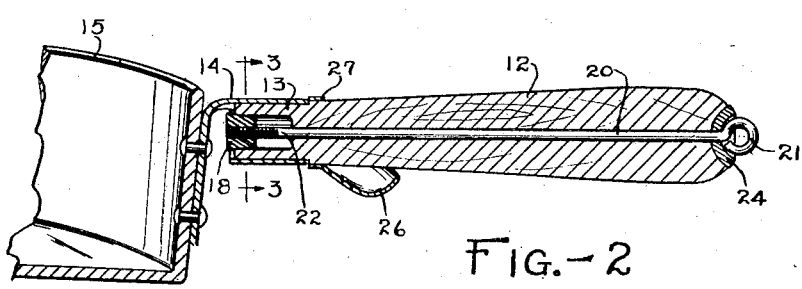
Figure 3:
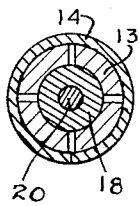
Figure 4:
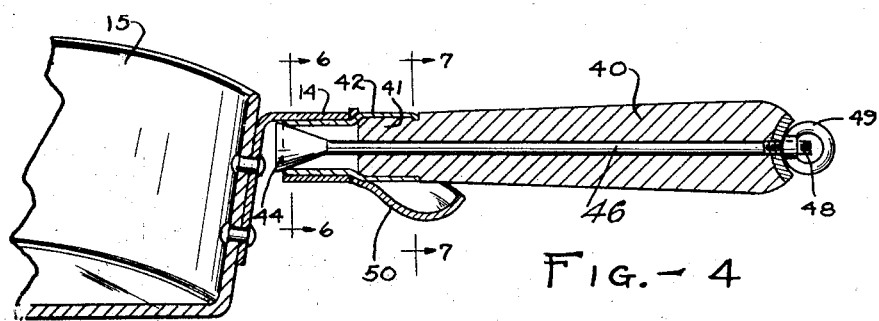
Figure 5:
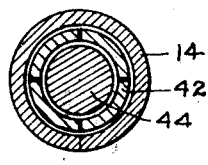
Figure 6:
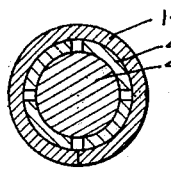
Figure 7:
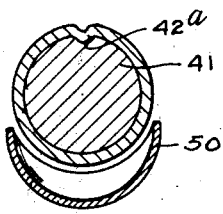
Figure 8:
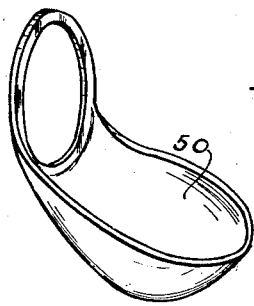

In the drawings Fig. 1 is a perspective view of a cooking utensil equipped with our novel handle construction; Fig. 2 is an enlarged cross-sectional view of the handle utensil shown in Fig. 1; Fig. 3 is a cross-sectional detail taken along the line 3—3 of Fig. 2; Fig. 4 is a modified form of handle construction embodying the features of our invention; Figs. 5, 6, and 7 are cross-sectional views taken along the lines 5—5, 6—6 and 7—7 respectively of Fig. 4 and Fig. 8 is a perspective detail of a heat deflecting shield which may comprise part of our novel handle construction.

Our invention contemplates the provision of a handle embodying in its construction a quick detachable means in the form of an expanding device for causing one end of the handle to firmly engage in a socket affixed to the article to be handled. The body of the handle is preferably formed of wood but may be formed of any other suitable material and in the form of our handle construction shown in Fig. 2, the body 12 of the handle is preferably cylindrically shaped at the end 13 thereof to engage in a socket member 14 attached to the cooking utensil 15. The end 13 of the handle, as shown in Figs. 2 and 3, is hollow to receive a coniform plug 18 and its cylindrical end 13 is split or parted as shown in Fig. 3 whereby the wedging action of the coniform member 18 will tend to cause the split sections of the handle to expand and firmly engage the cylindrical wall of the socket member 14. The coniform member 18 may be urged into pressing engagement with the split hollow end of the handle by any suitable means and as shown in Fig. 2 we provide a threaded rod 20 extending throughout the length of the handle whereby a protruding eyelet end 21 thereof will be disposed in a convenient position to be turned. The inner end of the rod 20 is threaded as shown at 22, to engage a threaded bore formed in the coniform member 18. We also provide at the outer end of the handle, a metallic thrust plate 24 to preserve the body of the handle when the rod 20 is turned. By turning the rod in one direction the member 18 will be caused to wedge the split end of the handle into firm engagement with the socket wall and by turning it in an opposite direction and thereafter imparting a slight blow thereto the wedge or coniform member 18 will be forced out of compression engagement with the handle end.

If desired a heat deflecting means may be incorporated in the handle structure to prevent scorching of the inner end thereof and such means may take the shape of a suitably formed pressed metal member 26 which may have an annular or cylindrical portion 27 circumferentially engaging the handle body.

In the embodyment of our invention shown in Fig. 4, the manner of attaching the handle to the utensil is substantially the same as shown in Fig. 2 but the inner end of the handle body 40 is not provided with an integral hollow split portion. We substitute therefor, a metallic tubular member 42 slightly reduced in diameter at one end to engage the socket member 14. The inner end 41 of the handle body 40 may be in tight engagement with the tubular member 42 and the tubular member 42 may have an indentation or an inwardly extending rib 42$^a$ (see Fig. 7) formed therein which may engage the inner end of the handle body 40 and in a groove provided therefor whereby the handle 40 is prevented from turning relative to the tubular member 42. A coniform wedging member 44 is provided in the general manner hereinbefore described, to expand the split portions of the member 42 into firm engagement with the cylindrical wall of the socket member 40. This wedging member 44 may, if desired, be formed to be rigid with the end of the rod 46, which rod corresponds to the rod 20 of the construction shown in Fig. 2, but in this form the outer end 48 thereof is threaded to be engaged by a ring 49 to bring about the wedging action of its inner end 44. This form of our invention may also have a heat deflecting shield 50 to prevent scorching of the underside of the wooden body 40 of the handle. This shield may take the form shown in perspective in Fig. 8 and be mounted upon the tubular member 42 comprising the inner end of the handle.

We claim:

1. The combination with a vessel, a socket member having a plate portion secured to the exterior of the vessel, one edge of said plate portion being bent at an angle to said secured part and formed into a substantially cylindrical socket some distance from the secured portion, a handle member entering said socket and having a cavity at its inner end, a conical sliding device in said cavity and a rod extending lengthwise of the handle and serving to draw said sliding device into the handle to bind said handle member into the socket.

2. The combination of a vessel having a round upright wall, a socket member having a curved plate portion riveted to such wall, the socket member then extending from the upper part of the secured portion substantially at right angles thereto and being rounded downwardly to provide a socket, a handle member entering the socket and means carried by the handle member for clamping it in the socket.

3. The combination of a vessel, a socket member having a plate portion secured to the exterior of a vessel and having a part bent from the plate portion and provided with a substantially cylindrical socket, a handle member entering said socket, means for clamping the handle member in place in the socket and a deflector having a ring portion surrounding the handle member adjacent the end of the socket and having a spoon-like portion on the under side of a handle to serve it for protecting it from excessive heat.

In testimony whereof, we hereunto affix our signatures.

BENNO B. LEUSTIG.
JOSEPH D. PETSCHE.